Patented Mar. 8, 1938

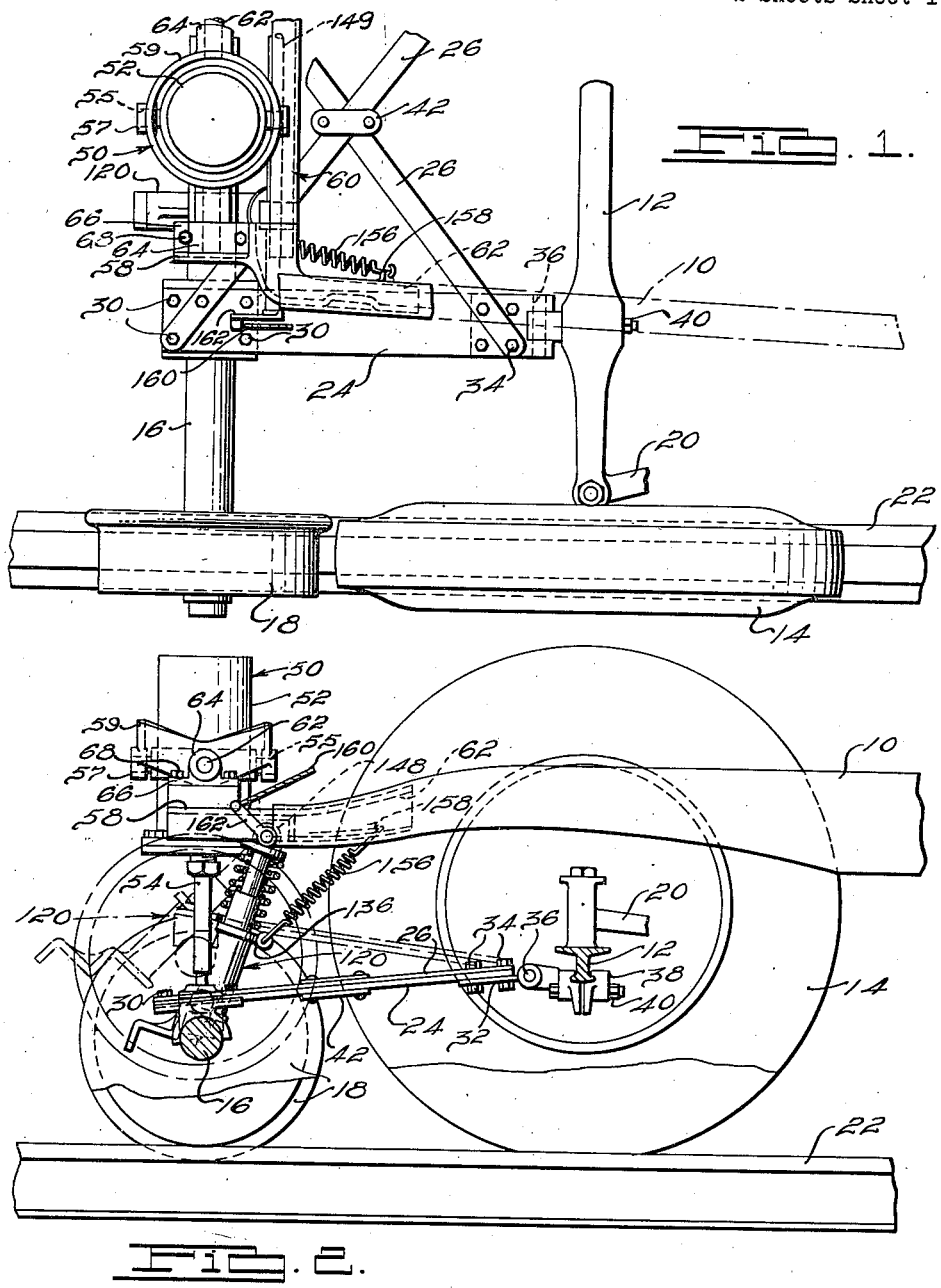

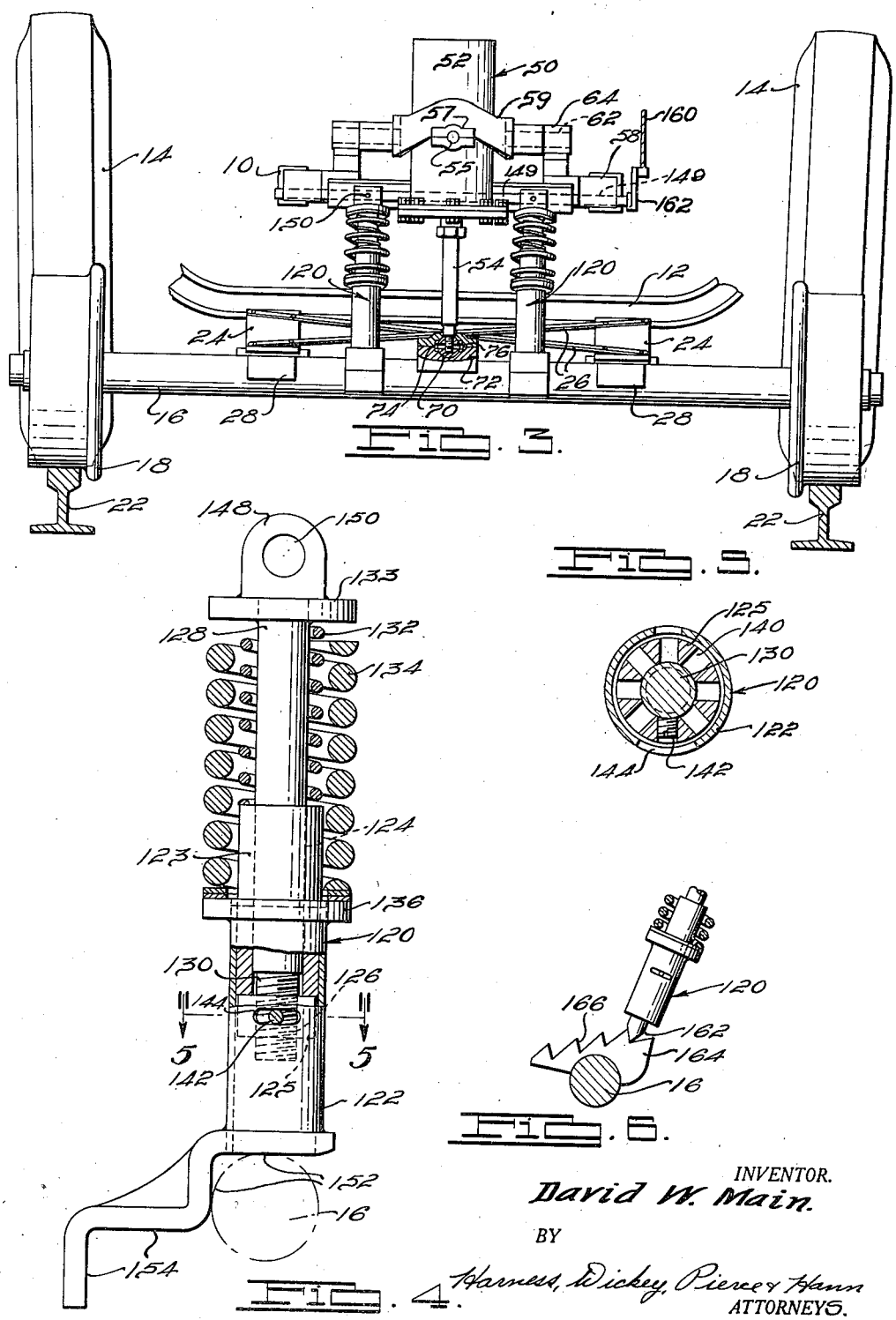

2,110,230

UNITED STATES PATENT OFFICE 2,110,230

COMBINED ROAD AND RAIL VEHICLE

David W. Main, Detroit, Mich., assignor to Transportation Systems, Inc., a corporation of Oklahoma Application October 21, 1935, Serial No. 45,941

20 Claims. (Cl. 105—215)

The present invention relates to vehicles adapted for either rail or road operation, and more particularly to pilot devices for use in such vehicles.

It is an object of the present invention to provide, in a combined road and rail vehicle having main and pilot axles, a safety device to positively retain the pilot axle in track engaging position.

It is a further object of the present invention to provide a safety device as above stated which forms a supplemental connection between the vehicle frame and the pilot axle, and which acts to retain the pilot axle in the lowered or track engaging position.

It is a further object of the present invention to provide a safety device as above stated which may selectively be moved from an effective to an ineffective position by mechanism conveniently located in the vehicle interior.

It is a further object of the present invention to provide a safety device as above stated which comprises a pair of standards, connected to the pilot axle at spaced points, and resiliently connected to a portion of the vehicle frame.

It is a further object of the present invention to provide a safety device of the last mentioned type in which the cooperating parts of the pilot axle and the standards include a plurality of different steps, which determine the effective lengths of the safety device.

It is a further object of the present invention to provide a combined road and rail vehicle embodying one or more pilot axles which may be raised from or lowered to a track engaging position, and which are continuously biased to a track engaging position.

It is a further object of the present invention to provide a vehicle of the last mentioned type in which the means for retaining the pilot axle in track engaging position acts continuously between the pilot axle and the pilot frame.

Further objects of the present invention are to generally simplify and improve the construction of combined road and rail vehicles, and to provide a construction which is reliable in operation and economical of manufacture and assembly.

Other objects and advantages of the present invention appear in the following description and in the appended claims.

In the drawings, throughout the several views of which corresponding reference characters are used to designate corresponding parts:

Figure 1 is a partial plan view of an illustrative embodiment of the present invention;

Fig. 2 is a view in side elevation with certain of the parts broken away, of the structure illustrated in Fig. 1;

Fig. 3 is a view in front elevation with certain of the parts broken away, corresponding to Figs. 1 and 2;

Fig. 4 is a detail view of one of the elements shown in Figs. 1, 2 and 3;

Fig. 5 is a view in horizontal section, taken along the line 5—5 of Fig. 4; and

Fig. 6 is a view of a modified stepped connection.

Combined road and rail vehicles of the general type to which the present invention relates may comprise in general a motor vehicle having a frame or body portion suspended in a conventional way from front and rear main trucks, which function during road travel to drive and to permit steering of the vehicle in the usual way. During track travel pilot trucks may be provided for each of the main trucks which serve to guide and retain the main truck on the tracks. An arrangement of this general character is disclosed and certain features thereof claimed in Patent 2,002,901 granted May 28, 1935 to David W. Main, the present applicant.

In accordance with the construction provided in the Main patent, each pilot truck is connected to the main vehicle frame through a raising and lowering device, which may be selectively operated to raise the associated pilot truck away from the tracks, or to lower it into engagement with the track, and cause it to assume a desired portion of the vehicle load. A connection is also provided between each pilot axle and the associated main axle which acts to positively align the main and pilot wheels and to prevent lateral or cross-wise movement between them. The axle connection is rigidly made to both the main and pilot axles and is of a spring-like character, so that in operation, such connection may also transmit a certain proportion of the vehicle load to the pilot axle.

In accordance with the present invention, a supplemental connection is made between each pilot axle and the vehicle structure. In the form illustrated, the supplemental connection comprises a pair of standards for each pilot axle, one end of each of which engages the pilot axle, and the other end of each of which is resiliently connected to the vehicle frame. The connection to the vehicle frame is also pivotal, so that the standards may be swung away from the associated pilot axle and thus rendered effective and ineffective at will. The swinging of the standards may be effected in various ways, the illustrated arrangement comprising a simple linkage which may conveniently be operated from the interior of the vehicle.

Preferably and as also illustrated, the connection between the lower end of each standard and the associated pilot axle is of the ratchet or stepped type, so that the effective length of each standard is determined by the particular ratchet or step engaged. In one embodiment, the lower end of each standard is formed to provide a plurality of spaced steps, any one of which is formed to cooperate with a seat formed on the pilot axle. In a modified embodiment, the lower end of each standard is formed to engage with any of a plurality of spaced ratchet steps formed in a seat provided on each pilot axle.

In accordance with one mode of practicing the present invention, the standards act as safety devices which supplement the action of the principal lowering and raising mechanisms. In operation, the main raising and lowering mechanisms may be actuated to lower the pilot axles into engagement with the tracks, and to impose a desired proportion of the vehicle load upon such pilot axles. After such lowering action, the standard may be swung into axle engaging position, after which they act to supplement the action of the main lowering mechanism, and provide a positive means for retaining the associated pilot axles in engagement with the tracks even in the event of failure, during operation, of the main raising and lowering mechanism. In this way, any danger of derailment as a consequence of failure of such raising and lowering mechanism is eliminated, and the safety of operation of the combined road and rail vehicle is correspondingly increased.

In accordance with a second mode of practicing the present invention, the standards may be retained in continuous engagement with the associated pilot axles and so provide a continuous force urging the pilot axles into track engaging positions. Under these conditions, the previously mentioned raising and lowering mechanism acts against such force in raising the pilot axles away from the track. Accordingly, the structure provided is one in which the pilot axle structure inherently retains the axles upon the tracks and external mechanism is provided to raise the axles from the track. Failure of such external mechanism, accordingly, is never accompanied by a removal of the pilot axles from the track.

Considering the above mentioned elements in more detail and referring particularly to Figs. 1, 2 and 3, an illustrative front end of a combined road and rail vehicle having a frame 10 is provided with a main front axle 12 and associated wheels 14, and with a pilot axle 16 having flanged wheels 18 of substantially smaller radius than that of wheels 14. Illustrative steering mechanism, which may of course be of any conventional type, for main front wheels 14 comprises the fragmentary element 20. It will be understood that main wheels 14 may support the vehicle during road travel, and may have an outer surface such as will adapt them to also ride upon rails 22, and thus form a support for the vehicle during rail travel as well, if desired.

The spacing between pilot wheels 18 is such as will adapt them for cooperation with tracks 22 and it will be understood that these wheels are designed to act primarily during track travel. During track travel, the pilot wheels guide and retain the main wheels 14 upon the track, and also sustain a part or all of the vehicle load, as determined by the adjusting mechanism.

In order to render the pilot wheels 18 effective to properly guide the main wheels 14, axle 16 is connected to main axle 12 by the arms 24 and the cross struts 26. The forward end of each arm 24 is preferably rigidly connected as by studs 30, to an associated seat 28 which in turn may be rigidly secured, as by welding, to axle 16. The rear end of each arm 24 is connected to a relatively short link 32, as by studs 34. Each link 32 in turn is hinged by a pin 36 to a split bracket 38 of the type embodied in the application of Sulo M. Nampa, Serial No. 50,384, filed November 18, 1935, and which may be rigidly secured to the underside of main axle 12 by a tightening stud 40. The cross struts 26 are secured at the respective ends thereof to arms 24 by the previously mentioned studs 30 and are also interconnected at their mid-points by a suitable clip 42.

As will be evident, the arms 24 and the cross struts 36 form a relatively rigid frame, which engages the main and pilot axles at points spaced substantial distances from the centers thereof, and acts to substantially eliminate any lateral or crosswise movement of either axle with respect to the other. The frame, through its hinged connections with the main axle 12, however, permits a relatively free vertical movement of pilot axle 16 with respect to axle 12, such, for example, as may be encountered in operation due to track irregularities, and such, of course, as is accompanied by a raising operation of pilot axle 16 from the track engaging position. It is noted that the raising and lowering of the pilot wheels 18 as affected by track irregularities may be different for each wheel, and consequently, one wheel 18 may be raised from the trackway while the other wheel 18 remains in engagement with the trackway. Under these conditions, a rotation of the pilot axle about such engaging wheel as a center results. If the frame comprising arms 24 and struts 36 were in fact absolutely rigid, it is recognized that this tilting could not occur and that an irregularity of either track would, therefore, raise or lower both pilot wheels simultaneously. It has been found in practice, however, that the frame comprising members 24 and struts 36 may be made sufficiently rigid to reduce lateral or crosswise movement between axles 12 and 16 to a permissible point, and still permit any required amount of raising of one pilot wheel 18 without affecting the position of the other pilot wheel 18. The construction thus afforded, accordingly, maintains the main and pilot wheels accurately in alignment, positively guiding and maintaining the main wheels upon the tracks, and still permits the pilot wheels to individually follow any irregularities which they may encounter.

The illustrated mechanism for raising and lowering the pilot axle 16 comprises a cylinder designated generally at 50 which is mounted upon the forwardly extending arms 58 of an auxiliary frame structure 60 for universal movement with respect thereto. Frame structure 60 also includes rearwardly extending arms 62 which are spaced apart to correspond to the spacing between the main side members on frame 10 and are rigidly secured thereto in any suitable manner.

Cylinder 50 is preferably of the type embodied in the above identified Nampa application, and comprises generally a conventional housing 52 which accommodates a usual piston (not shown) connected to the piston rod 54. Trunnions 55 secured to housing 52 in radially outwardly extending relation are pivotally supported in bearings 57 formed in a cradle 59. Cradle trunnions 62 secured to cradle 59 and disposed normal to trunnions 55 are pivotally supported in bearings 64 formed in brackets 66 which are suitably secured, as by the studs 68, upon the above mentioned arms 58. Housing 52 is thus universally mounted with respect to the vehicle frame, and tilting movements of the latter are not transmitted to piston rod 54.

As best shown in Fig. 3 the lower end of piston rod 54 is threaded into a ball 70 which is supported within a socket 72. Socket 72 may be rigidly secured to the pilot axle 16 in any suitable manner. A transverse pin 74 which passes through and extends outwardly from ball 70 cooperates with the elongated recesses 76 formed in the socket 72, thus permitting a limited amount of universal movement between the lower end of rod 54 and socket 72, and still preventing axial rotation of rod 54. The just described parts, accordingly, form a universal connection between rod 54 and the pilot axle 16. The control conduits for cylinder 50 may be arranged as shown in the above identified Main patent, and have been omitted from the drawings to avoid confusion. It will be understood cylinder 50 may be actuated to either raise or lower pilot axle 16. Depending also upon the pressure developed within cylinder 50, pilot axle 16 may be caused to take all or a desired share of the forward part of the vehicle load. A compressible fluid, such as air, is preferably used, so that cylinder 50 forms a resilient connection between the vehicle and axle 16.

Referring particularly to Figs. 2, 3 and 4, a supplemental connection between frame 10 and the pilot axle 16 is afforded by the pair of spaced arms 120, which are of similar construction. In the form illustrated, each arm 120 comprises a main tubular member 122, into which a sleeve 123 is fitted in stationary relation to member 122. A plunger 128 is formed to be relatively, freely, slidably received in the opening 124 formed in sleeve 123, and is provided with an externally threaded shank portion 130, which is threaded into an adjusting nut 125. A relatively light positioning spring 132 surrounds plunger 128, and is seated between the shoulder 133 formed at the upper end thereof, and the upper edge of sleeve 123. A corresponding but substantially heavier load spring 134 also surrounds plunger 128, and is seated between the shoulder 133 and a corresponding shoulder 136 formed intermediate the ends of cylinder 122. The lighter spring 132 acts to maintain adjusting nut 125 in engagement with the lower end of sleeve 123.

As best shown in Fig. 5, adjusting nut 125 is provided with a series of spaced radial openings 140, one or more of which may be tapped to accommodate a locking set screw 142. An opening 144 in the side of cylinder 122 affords access to the openings 140. It will be understood that by backing off set screw 142, nut 125 may be notched around by inserting a suitable tool through the opening 144 and into the openings 140. This adjustment correspondingly draws plunger 128 downwardly within cylinder 122 or permits it to move outwardly thereof under the influence of spring 132, and effects an adjustment of the free length of the arm 120.

The upper end of each arm 120 is provided with a clevis 148 through which it is connected to a rock shaft 149 journaled in the auxiliary frame member 60. Set screws 150 prevent rotation between arms 120 and shaft 149. The lower end of each arm 120 is formed to provide a succession of stepped seats 152 and 154, which form a connection between each arm 120 and pilot axle 16.

Alternatively, as shown in Fig. 6, the lower end of each arm 120 may be formed to provide the head 162, and a ratchet type seat 164 having teeth 166 may be secured to axle 16 for selective engagement by each arm 120.

Each of the arms 120 is biased to the full line position shown in Fig. 2 by a tension spring 156, suitably connected between the previously mentioned shoulder 136 and a bracket 158 formed on the frame 10. Suitable provision for swinging each arm 120 between the full line and dotted line positions of Fig. 2 may comprise the pull connection 160, which preferably extends into the interior of the vehicle, and is connected to a crank 162 suitably secured at the end of rock shaft 149.

In operation, the relatively light positioning spring 132 maintains the upper edge of nut 125 in engagement with the lower end of the inner sleeve 123 of each arm and is effective to prevent rattling of the parts during such times as arms 120 may occupy the dotted line positions shown in Fig. 2. In this position, the adjustment is preferably such that the upper end of the load spring 134 is spaced slightly from the collar 133. Upon lowering the pilot axle 16 onto the trackway, the control link 160 may be actuated, to release the arms 120, permitting each of them to move to the full line positions shown in Fig. 2 under the influence of the tension springs 156 and to a position in which one or the other of the stepped seats 152 and 154 is directly over the pilot axle 16. When in such operative positions, the arms 120 form positive safety devices to prevent more than a predetermined and adjustable amount of upward movement of axle 16 with respect to frame 10. Accordingly, any failure of the raising and lowering mechanism comprising jack 50, is not accompanied by a raising of the pilot axle from the trackways. Should such a failure occur, the load previously transmitted to the pilot axle through the cylinder is transmitted thereto through the main or load springs 134 of the arms 120. Also the arms 120 act to transmit to the pilot axle, any excess load which might otherwise be borne by the main wheels and unduly compress the tires thereof.

In certain instances it is desirable to adjust the arms 120 so that upon lowering of the arms 120 to active position, they immediately share the vehicle load with the raising and lowering mechanism. In either instance, if the load on the vehicle is varied, as by unloading or loading, the arms 120 automatically take up the difference in spacing between the vehicle frame and the pilot axle, either the balancing spring 132 or both springs 132 and 134 expanding or contracting, or the seating of the arms being changed, to effect such take up.

If the vehicle is heavily loaded at the time arms 120 are lowered, it may be expected that the upper seats 152 will be initially effective, because of the reduced spacing between the vehicle and the pilot axle caused by the load. If the load is then gradually decreased, causing a raising of the vehicle level, a point may be reached in which the lower seat may be above the pilot axle level, permitting a further swinging of the arms to bring such lower seat into effective position. A similar action occurs in the use of the arrangement of Fig. 6, the arms 120 automatically moving up the teeth 166 in response to decreasing load. In the reverse case, of gradually increasing load, a reverse or stepping down of the ends of the arms 120 may be effected by actuating the cylinder 50 to increase the spacing between the pilot axle and the vehicle sufficiently to release the arms and permit the operator to swing the arms outwardly through connector 160. By letting up on cylinder 50, and again dropping the arms, a new step position will be assumed by them dependent upon the vehicle load.

It will also be evident that because of the free connections between the lower end of each arm 120 and pilot axle 16, that any tendency of either pilot wheel 18 to fall further away from the frame 10, due to track irregularities or other causes, is not interfered with by the arms 120. Such falling away is not interfered with by the cylinder rod 54 since the latter is located at substantially the mid-point of the pilot shaft 16.

As an alternative mode of operation, the arms 120 may be permitted to remain continuously in cooperative engagement with the pilot axle 16. With this arrangement the cylinder 50 acts to retract the pilot axle 16 against the force of the arms 120. In operation, accordingly, the pilot axle is continuously urged by the arms 120 to the track engaging position, and any failure of the cylinder or associated mechanism results in the pilot axle moving to the track engaging position.

It will be noted that arms 120, in addition to limiting vertical movements of pilot axle 16, also are effective to limit a horizontal movement thereof towards the main axle, and act, accordingly, to supplement the aligning frame comprising arms 24 in maintaining the main and pilot axles properly spaced.

It will be evident that although the specific embodiment of the present invention has been illustrated with reference to a front axle, the principles and features thereof are applicable to both front and rear axles. It will also be evident that various changes may be made in the form, number and arrangement of the parts within the spirit and scope of the present invention as defined in the appended claims.

What is claimed is:

1. A combined road and rail vehicle having main and pilot trucks comprising selectively operable means connected between said pilot truck and said vehicle for raising and lowering said pilot truck from and to a track engaging position and for maintaining said pilot truck in alignment with said main truck, and a protective device forming a supplemental connection between said vehicle and said pilot truck for maintaining said pilot truck in engagement with said tracks.

2. A combined road and rail vehicle having a main truck and a pilot truck comprising selectively operable means connected between said pilot truck and said vehicle for raising and lowering said pilot truck from and to a track engaging position and for maintaining said pilot truck in alignment with said main truck, and means forming a supplemental connection between said vehicle and said pilot truck and effective to resiliently maintain said pilot truck in a track engaging position.

3. A combined road and rail vehicle having a main truck and a pilot truck for guiding said main truck comprising selectively operable means for raising and lowering said pilot truck from and to a track engaging position and for maintaining said pilot truck in alignment with said main truck, and a protective device forming a supplemental connection between said vehicle and said pilot truck and comprising a pair of standards for resiliently maintaining said pilot truck in track engaging position disposed at spaced points along said pilot axle.

4. A combined road and rail vehicle having a main truck and a pilot truck, comprising selectively operable means connected between said pilot truck and said vehicle for raising and lowering said pilot truck from and to track engaging position, a supplemental protective connection between said vehicle and said pilot truck for maintaining said pilot truck in track engaging position, and means for rendering said supplemental connection effective and ineffective at will.

5. A combined road and rail vehicle having a main truck and a pilot truck comprising selectively operable means for raising and lowering said pilot truck from and to a track engaging position, a pair of standards pivotally connected to said vehicle, and means for swinging said standards into engaging relation with said pilot truck to thereby maintain it in track engaging position.

6. A combined rail and road vehicle having a main truck and a pilot truck comprising selectively operable means for raising and lowering said pilot truck from and to a track engaging position, a pair of standards pivotally connected to said vehicle at symmetrically spaced points from the longitudinal center line thereof, and means for swinging said standards into engaging relationship with said pilot truck to thereby maintain it in track engaging position.

7. A combined rail and road vehicle having a main truck and a pilot truck comprising selectively operable means for raising and lowering said pilot truck from and to a track engaging position, a pair of standards pivoted to said vehicle frame at symmetrically spaced points from the longitudinal axis thereof, and adapted to freely seat upon said pilot truck, and means for swinging said standards into and out of seating relationship with said pilot truck.

8. A combined road and rail vehicle having a main axle and a pilot axle, comprising aligning means connecting said axles for preventing relative lateral movement thereof, continuously acting means for urging said pilot axle to a track engaging position including a pair of standards connected to said vehicle frame at points symmetrically spaced from the longitudinal axis thereof, and means for raising said pilot axle from said track engaging position against the force of said continuously acting means.

9. A combined rail and road vehicle having a main truck and a pilot truck, comprising a pair of resilient standards connected to said frame and freely seated against said pilot truck for continuously urging said pilot truck into track engaging position, and means for raising said pilot truck from said track engaging position against the force of said standards.

10. A combined road and rail vehicle comprising in combination a main truck connected to said vehicle, a pilot truck, means urging said pilot truck into track engaging position comprising a standard pivotally connected to said vehicle and freely seated upon said pilot truck.

11. A combined rail and road vehicle comprising in combination a main truck connected to said vehicle, a pilot truck, means urging said pilot truck into track engaging position comprising a pair of standards connected to said vehicle and freely seated upon said pilot truck, said standards being disposed in symmetrically spaced relation from the longitudinal center line of said vehicle.

12. In a combined road and rail vehicle having a pilot truck, a standard for forming resilient connection between said vehicle and said truck, comprising a pair of telescopically related elements, means pivotally connecting one of said elements to said vehicle, means connecting the other of said elements to said pilot truck, and spring means for controlling relative movement between said elements.

13. In a combined road and rail vehicle having a pilot truck, a standard for resiliently connecting said pilot truck to said vehicle comprising a pair of relatively moveable elements, means pivotally connecting one of said elements to said vehicle, and means forming a series of steps on the other of said elements for selective engagement with said pilot truck.

14. In a combined road and rail vehicle, a pilot truck associated with said vehicle, a standard for forming a connection between said vehicle and said pilot truck comprising a pilot truck engaging portion, and a succession of steps supported on said pilot truck to selectively form seats for said standard.

15. A combined road and rail vehicle comprising in combination a main axle, a pilot assembly having a pilot axle adapted to be raised and lowered from and to track engaging position; aligning means connected between said pilot assembly and said vehicle for preventing transverse relative movement between said main and pilot axles and means for retaining said pilot axle in track engaging position comprising a swingable arm connected at one end of said vehicle and disposed to have its other end freely seated upon said pilot assembly.

16. A combined road and rail vehicle comprising a main vehicle structure including a main axle; a pilot structure having a pilot axle adapted to be raised and lowered from and to track engaging position; aligning means connected between said pilot structure and said main vehicle structure for preventing relative transverse movement of said main and pilot axles; and means for retaining said pilot axle in track engaging position comprising an arm, means adapting one end of said arm to be freely seated upon one of said structures, and means movably connecting the other end of said arm to the other of said structures so that said arm may be selectively moved into and out of seating position.

17. A combined road and rail vehicle comprising a main vehicle structure including a main axle; a pilot structure having a pilot axle adapted to be raised and lowered from and to track engaging position; aligning means connected between said pilot structure and said main vehicle structure for preventing relative transverse movement of said main and pilot axles and means for retaining said pilot axle in track engaging position comprising a resiliently constructed arm, means for adjusting the length of said arm, means adapting one end of said arm to be freely seated on one of said structures, and means movably connecting the other end of said arm to the other of said structures so that said arm may be moved into and out of seating position.

18. A combined road and rail vehicle having a main axle and a pilot axle comprising selectively operable means connected between said vehicle and said pilot axle for raising and lowering said pilot axle from and to track engaging position, aligning means for preventing transverse relative movement between said main and pilot axles, supplemental connecting means disposed to co-operate between said vehicle and said pilot axle to maintain said pilot axle in track engaging position, and means forming a pivotal connection between said vehicle and said supplemental means so that said supplemental means may be swung into or out of co-operative relation to said pilot axle.

19. A combined road and rail vehicle structure comprising in combination a main truck connected to said vehicle, a pilot structure, means urging said pilot structure into track engaging position comprising a standard pivotally connected at one end to one of said structures and freely seated at the other end upon the other of said structures.

20. In a combined road and rail vehicle having a pilot truck, a standard for forming resilient connection between said vehicle and said truck, comprising a pair of relatively movable elements, means pivotally connecting one of said elements to said vehicle, means connecting the other of said elements to said pilot truck, a first spring connected between said elements and effective to urge said pilot truck to a predetermined position, and a second spring connected between said elements and disposed to be rendered effective upon compression of said first mentioned spring to a predetermined extent.

DAVID W. MAIN.